United States Patent
Bakthavathsalu et al.

(10) Patent No.: US 10,205,705 B2
(45) Date of Patent: *Feb. 12, 2019

(54) METHOD AND SYSTEM FOR MANAGING A VPN CONNECTION

(71) Applicant: BlackBerry Limited, Waterloo (CA)

(72) Inventors: Krishna Kumar Bakthavathsalu, Toronto (CA); Ania Halliop, Mississauga (CA); Jason Songbo Xu, Toronto (CA); Daryl Ming Ken Mau, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,750

(22) Filed: Jul. 22, 2013

(65) Prior Publication Data

US 2014/0207946 A1   Jul. 24, 2014

Related U.S. Application Data

(63) Continuation-in-part of application No. 13/749,292, filed on Jan. 24, 2013.

(51) Int. Cl.
*G06F 15/173* (2006.01)
*H04L 29/06* (2006.01)

(52) U.S. Cl.
CPC ................................ *H04L 63/0272* (2013.01)

(58) Field of Classification Search
None
See application file for complete search history.

(56) References Cited

U.S. PATENT DOCUMENTS

| | | | |
|---|---|---|---|
| 6,079,025 A * | 6/2000 | Fung | 713/323 |
| 8,346,910 B2 | 1/2013 | Barrett | |
| 8,499,331 B1 * | 7/2013 | Yehuda et al. | 726/1 |
| 2004/0032168 A1 | 2/2004 | Allison et al. | |
| 2008/0080457 A1 * | 4/2008 | Cole | H04L 12/5692 370/342 |
| 2009/0046667 A1 | 2/2009 | Pelletier et al. | |
| 2009/0187968 A1 * | 7/2009 | Roese et al. | 726/1 |
| 2011/0138210 A1 * | 6/2011 | Belali | G06F 1/3209 713/323 |

(Continued)

FOREIGN PATENT DOCUMENTS

EP        2403212 A1       1/2012

OTHER PUBLICATIONS

Extended European Search Report in EP 13152590, dated Jun. 12, 2013.

(Continued)

*Primary Examiner* — Cheikh T Ndiaye
(74) *Attorney, Agent, or Firm* — Moffat & Co (57) ABSTRACT

A method and computing device configured to send and receive traffic over a virtual private network (VPN) connection, the computing device having a processor; and a communications subsystem, where the method determines that a first trigger had been met, wherein the first trigger is dynamically configured based on at least one factor at the computing device; monitors whether data traffic exists over the VPN connection for a first time period; and if no data traffic exists over the VPN connection for the first time period, disconnects the VPN connection.

20 Claims, 6 Drawing Sheets

(56) References Cited

U.S. PATENT DOCUMENTS

| | | | |
|---|---|---|---|
| 2012/0002813 A1* | 1/2012 | Wei et al. | 380/270 |
| 2012/0078998 A1 | 3/2012 | Son et al. | |
| 2012/0196644 A1* | 8/2012 | Scherzer et al. | 455/524 |
| 2013/0091537 A1* | 4/2013 | Parla et al. | 726/1 |

OTHER PUBLICATIONS

United States Patent and Trademark Office, Non-Final Rejection on U.S. Appl. No. 13/749,292, dated Nov. 5, 2014.

United States Patent and Trademark Office, Final Rejection on U.S. Appl. No. 13/749,292, dated Jun. 5, 2015.

"Does using a VPN significantly decrease battery life?", http://forums.macrumors.com/threads/does-using-a-vpn-significantly-decrease-battery-life.1612882/, posted Jul. 22, 2013, accessed on Mar. 21, 2106.

"What is VPN on demand, and how do I get it to work with iOS", http://apple.stackexchange.com/questions/44947/what-is-vpn-on-demand-and-how-do-i-get-it-to-work-with-ios, posted Mar. 21, 2012, accessed on Mar. 21, 2106.

United States Patent and Trademark Office, Non-Final Rejection on U.S. Appl. No. 13/749,292, dated Jan. 5, 2016.

USPTO, Office Action for U.S. Appl. No. 13/749,292, dated Nov. 4, 2016.

USPTO, Final Rejection on U.S. Appl. No. 13/749,292, dated Jun. 15, 2016.

European Patent Office, Office Action for Application No. 13152590.9, dated Mar. 23, 2016.

USPTO, Office Action for U.S. Appl. No. 13/749,292, dated Jul. 13, 2017.

USPTO, Office Action for U.S. Appl. No. 13/749,292, dated Oct. 4, 2017.

USPTO, Non-Final Rejection for U.S. Appl. No. 13/749,292 dated Feb. 27, 2018.

USPTO, Advisory Action or U.S. Appl. No. 13/749,292 dated Jan. 25, 2018.

\* cited by examiner

METHOD AND SYSTEM FOR MANAGING A VPN CONNECTION

CROSS-REFERENCE TO RELATED APPLICATIONS

The present application is a continuation-in-part of U.S. patent application Ser. No. 13/749,292, filed Jan. 24, 2013, the entire contents and drawings of which are incorporated herein by reference.

FIELD OF THE DISCLOSURE

The present disclosure relates to connectivity between a device and a network server and in particular relates to management of a virtual private network (VPN) connection between a device and a server.

BACKGROUND

A virtual private network is a private communication network used to communicate confidentially over a publicly accessible network. VPN message traffic can be carried over a public network infrastructure, such as the Internet, on top of standard protocols. VPNs are used, for example, to enable employees to connect securely to a corporate network.

VPN connections are used to carry both data traffic and control traffic. The control traffic is used to maintain a VPN connection or to ensure that the connection is still active. For example, a VPN tunnel may proceed through a firewall/network address translation (NAT), which may close the tunnel if no traffic is detected for a certain time period. Thus, in many cases, a VPN client or server may send messages to the firewall/NAT to keep the tunnel open. In other cases, control messaging can be provided between a VPN client and a VPN server in order to ensure that the connection is still active.

However, if the VPN connection is not being used for data transfer, the control messaging between the VPN client and VPN server still utilize network resources and further, if the VPN client is on a device has an internal power source, then such traffic uses power source resources.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing device configured to send and receive traffic over a virtual private network (VPN) connection, the method comprising: determining that a first trigger had been met, wherein the first trigger is dynamically configured based on at least one factor at the computing device; monitoring whether data traffic exists over the VPN connection for a first time period; and if no data traffic exists over the VPN connection for the first time period, disconnecting the VPN connection The present disclosure further provides a computing device configured to send and receive traffic over a virtual private network (VPN) connection, the computing device comprising: a processor; and a communications subsystem, wherein the computing device is configured to: determine that a first trigger had been met, wherein the first trigger is dynamically configured based on at least one factor at the computing device; monitor whether data traffic exists over the VPN connection for a first time period; and if no data traffic exists over the VPN connection for the first time period, disconnect the VPN connection.

Various embodiments of the present disclosure relate to virtual private networks. As indicated above, a VPN is a private communications network used to communicate confidentially over a publicly accessible network and message traffic can be carried over a public network infrastructure such as the Internet. Examples of VPN protocols, for example, may include the Internet Protocol Security (IPSec) standard, as defined by the Internet Engineering Task Force (IETF), Layer 2 Tunneling Protocol (L2TP), Secure Sockets Layer (SSL) VPN, Point to Point Tunneling Protocol (PPTP), among others.

Figure 1:
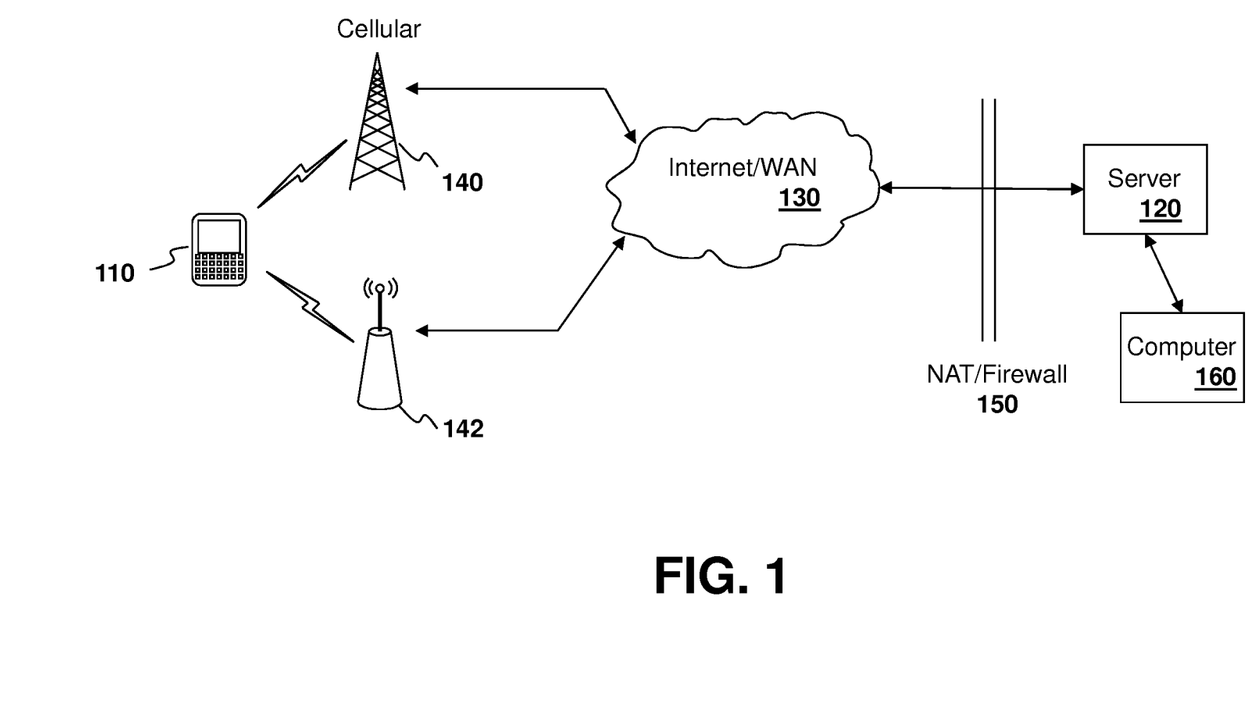
FIG. 1 is a block diagram showing an example architecture for a VPN connection between a device and server.

Reference is now made to FIG. 1, which shows an example network architecture diagram for communication between a device and a VPN server. In particular, a device 110 includes a VPN client that wishes to establish a connection with a VPN server 120. Device 110 could be any computing device and can include both wired and wireless devices. For example, device 110 may be a desktop computer, a laptop computer, smartphone, mobile device, tablet, among others.

In the example of FIG. 1, device 110 is a mobile device which may communicate using a wide area network such as the Internet 130 utilizing various technologies. For example, device 110 may be a cellular device and may communicate through a cellular network 140.

In addition, or alternatively, device 110 may also communicate through am access point 142, which may include, for example, a WI-FI, WiLAN, other wired or wireless communication technology.

In the embodiment of FIG. 1, server 120 is behind a firewall/NAT 150. For example, server 120 may be part of an enterprise network that is protected through the firewall/NAT 150. In this regard, communications between device 110 and server 120 will have to tunnel through the firewall/NAT 150.

Further, other computing devices or servers, shown by reference 160, can also be part of the enterprise network and communicate with server 120.

In order to communicate between device 110 and server 120, a VPN client on device 110 needs a VPN profile that is verified by server 120. The VPN profile contains information that may be required to log into a VPN. The VPN profile may be related to the type of VPN and could include a variety of information, such as, for example, a user name, a password, address of the VPN server including an IP address, a subnet mask, a domain name server (DNS), domain name, cryptographic algorithms, configuration of NAT timeouts, among other information.

Utilizing the profile, a device 110 can then establish a secure connection with a server 120 over which communication is encrypted and is kept private.

The VPN connection may be established in a variety of ways. A first is a user established VPN in which a user of device 110 may initiate the VPN connection manually. A second is an automatic connection that may be established between device 110 and server 120. The present disclosure focuses on the second.

An automatic VPN connection may be established if one or more parameters or rules are met. For example, a user of a mobile device, or an enterprise administrator controlling server 120, may wish to have device 110 automatically connect to the server 120 using cellular in all cases. Thus, mobile device 110 may establish a VPN connection automatically whenever a cellular radio connection is available and active on device 110.

In other cases a mobile device may be communicating over an access point 142. One rule or criterion might be that an automatic VPN connection is established if the WiFi network has a particular identity. Thus, if the profile of a WiFi network, for example, matches predetermined criteria such as a home network or work network, then the device 110 may automatically establish a VPN connection with server 120. In some embodiments such WiFi connection may preempt a connection over cellular. Other examples are possible.

The policies or rules for automatic VPN connection may be configured by a user in some cases, may be pushed to the device through an enterprise policy by an IT administrator, or may be preconfigured by a carrier or device manufacturer, for example.

If a VPN connection is automatically established but then subsequently goes down, policies may also exist on the device 110 to automatically re-establish the connection in order to maintain the connection between device 110 and server 120.

In order to maintain the VPN connection, control traffic can be sent between device 110 and server 120. Such control traffic, for example, may include messages to indicate to both the VPN client and VPN server that the connection is still active.

Further, the control traffic may also refresh the Internet Protocol (IP) tunnel. This may be done, for example, if the tunnel is travelling through a NAT 150. Such control traffic may, for example, be sent periodically in order to maintain the connection when there is no data being sent over the tunnel.

However, the use of control traffic to keep the connection active when no data is sent for long periods of time may be costly in terms of network resource usage as well as the power supply life on the device. Specifically, in order to send such control traffic, the device will need to turn on its radio to periodically send or receive such control traffic, which leads to a drain in the power supply and further such control traffic utilizes network resources which may be a scarce commodity. Also, the sending of control traffic would count as data usage for a cellular data plan, and could cost a user money.

While the disclosure below discusses a device in terms of its battery, in some embodiments a power supply or power pack may be used. Such power supply may include a battery, but may also include other power sources such as a fuel cell system, a super capacitor, among others, acting either individually or in concert with each other. In other embodiments, a power supply may be a wall outlet, solar cell, among others.

In accordance with one embodiment of the present disclosure, a device may automatically establish a VPN connection, but if the VPN connection is not being used, the VPN connection may be shut down in order to provide for, for example, power savings and network resource savings. In particular, the maintaining of a VPN connection over a cellular connection requires periodic messages to be sent which wakes up the cellular radio. This may cause substantial drain to the power source.

Therefore, in accordance with one embodiment of the present disclosure, an automatic VPN connection may be taken down if there is no use of that connection. In particular, the amount of time the VPN connection is active is minimized by shutting down the VPN connection with some intelligence.

Figure 2:
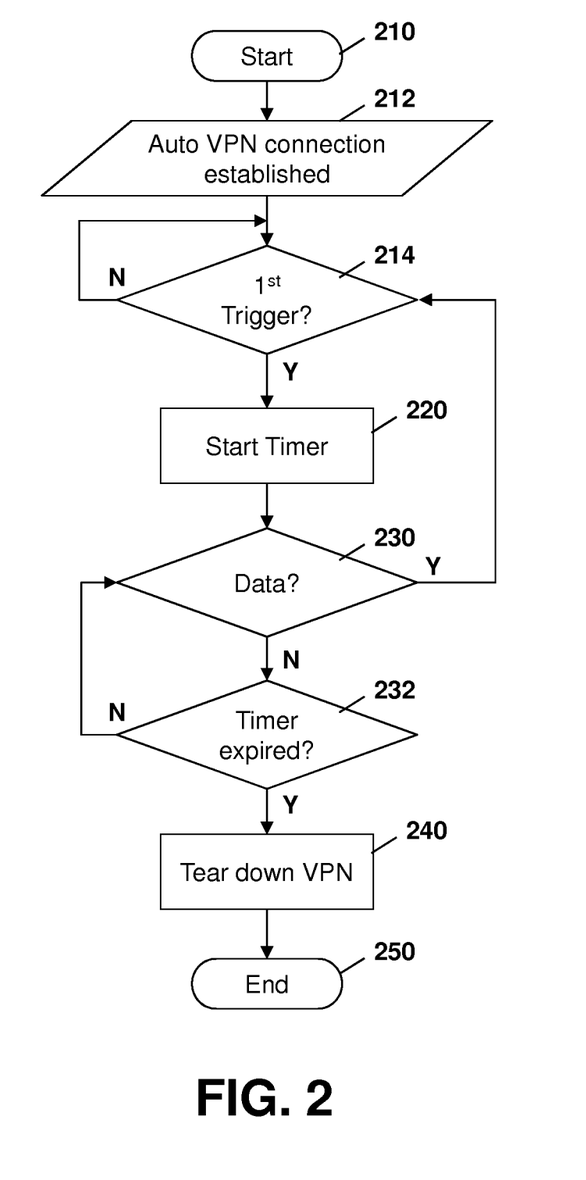
FIG. 2 is a flow diagram showing an example process at a computing device for tearing down a VPN connection.

Reference is now made to FIG. 2, which shows a process at a computing device. The process of FIG. 2 starts at block 210 and has a precondition that an automatic VPN connection is established, as shown by block 212.

The process then proceeds to block 214, in which a check is made to determine whether a first trigger has occurred. In one embodiment the trigger may be that the device goes into a "stand-by mode". As used herein, the term "stand-by mode" may also be referred to as a "sleep mode" or "idle operation".

In particular, an active operation or mode is the way the portable electronic device operates when it is in active use or actively being used by a user. Generally speaking, power demands of the device are typically higher during an active operation than during a stand-by mode. A device may have one or more active modes, with different levels of power demand.

A stand-by mode is the way the device operates when it is not in an active mode, and the power demands are generally low or lower than in an active mode. A device may have one or more stand-by modes and the stand-by mode may include, for example, de-activating some device functionality, powering down the device, turning or dimming a display, slowing down processing speed, turning off the device or otherwise operating the device in ways to conserve power.

A portable electronic device may enter a stand-by mode automatically. Some portable electronic devices enter a stand-by mode after a time interval, during which, if there is an absence of user input via any input device, the device enters the standby mode. When a portable electronic device enters stand-by mode, the display of the portable electronic device may, for example, turn off completely, or turn off in part, or become static or dim or inactive or unresponsive to touch.

Thus, in one embodiment, the trigger at block 214 may be that the device enters into a stand-by mode.

In another embodiment, the trigger at block 214 may comprise a combination of factors. For example, a combined trigger may be that the device enters into a stand-by mode, and also that the device has no external power source. In this case, if the device is plugged in, or drawing power from an external source, the trigger at block 214 may not be met.

In some embodiments, rather than the trigger at block 214 being the entering of the stand-by mode, an inactivity timer could be used instead. When the timer reaches a predetermined threshold then the first trigger could be met. Such timer may be used, for example, if a user has set the stand-by time to be extremely long on the device, and an inactivity timer may provide for a shorter time period than the time the device enters into a stand-by mode.

In other embodiments, the first trigger may be dynamic. In other words, the trigger may change based on a predefined condition at the device. For example, in one embodiment, the trigger may vary based on the battery level of the device. For example, various gradients may be present which would determine how aggressively the VPN connection should be taken down. In one embodiment, four levels could exist, namely: very passive; passive; aggressive; and very aggressive. The battery level could determine which level of aggressiveness is used for power optimization at the device. Other examples and numbers of levels are however possible and the present disclosure is not limited to any particular level of granularity with regard to the number of levels.

Using four levels, Table 1 below illustrates one example of the power optimization model that may be used depending on the battery level.

TABLE 1

Selection of Power Optimization Model

| Existing Battery Charge | Power Optimization Model |
| --- | --- |
| 100-75% | Very passive |
| 74-50% | Passive |
| 49-25% | Aggressive |
| 24-0% | Very Aggressive |

Based on Table 1 above, the optimization model may be selected to conform with the battery level of the device. However, Table 1 is merely an example and in other embodiments, other factors besides the battery level may be used to dynamically vary the trigger. For example as described below, the time of day or the nature the applications running on the device may also be used to dynamically change the trigger.

Various factors may be used to trigger the tearing down of the automatic VPN connection. As described above, one factor may be the screen state, wherein if the device transitions from an active mode to an standby mode, this may be used as a trigger.

In a further embodiment, the device charge state may be used as a trigger. In particular, if the device is connected to an external power source, in one embodiment this may prevent a trigger from occurring, while the use of the devices internal power supply may cause a trigger event.

In a further embodiment, the IP address the VPN tunnel utilizes may be a determining factor. The IP may determine the service the device is using and if the device detects that the IP address is within a certain IP range then the VPN power optimization may be turned on or off.

In a further embodiment, the device application could be used for the trigger or for the dynamic activation of the trigger. In particular, an application in some embodiments may be classified as an enterprise application or a personal application. VPN resources may be optimized to be used for enterprise applications, wherein even at a lower battery state a less aggressive power optimization model may be used if enterprise applications rather than personal applications are using the VPN tunnel to exchange data. Other applications are possible.

In another embodiment, data inactivity may be used as a trigger, as described above.

In a further embodiment, the port number used may be used as a trigger, as this may indicate the type of application utilizing the VPN.

In another embodiment the protocol used over the VPN tunnel may be a trigger. Thus, if certain data is using a real time protocol (RTP), this may be a trigger to take down VPN connections in more aggressive situations when no other types of data traffic are utilized, since the RTP may indicate streaming personal content.

In another embodiment, the time of day may be used either as a trigger or to dynamically vary the trigger. For example, after business hours, a more aggressive power optimization model may be utilized. In other examples, power optimization may be turned off during business hours completely. In other embodiments the user of the device could set the times for triggering events or triggers.

In a further embodiment, the wireless signal strength may further be used as a trigger. If the device is near a cell edge, intermittent or spotty cellular coverage may be present and thus connection to a VPN gateway may not be successful. This may result in unnecessary retries or drop connections leading to battery drain on the device. Instead of wireless signal strength, the signal to noise ratio could be used as a threshold. Thus even in situations having good signal strength, if the signal to noise ratio is poor then this may be a trigger to tear down the VPN connection.

In one embodiment, one or more of the above factors could be combined to provide a trigger. For example, in one embodiment, the triggers may vary based on the power optimization model. For example, in a very passive model, the trigger may merely be the screen state and data inactivity timer. If the device transitions to a passive power optimization model, the trigger may be the screen state, the data inactivity timer, as well as wireless signal strength.

If the device transitions to an aggressive power optimization model, the trigger may be a combination of the screen state, data inactivity timer, wireless signal strength and device time.

If the device transitions to a very aggressive power optimization model, the trigger may be a combination of the screen state, data inactivity timer, wireless signal strength, device time and traffic prioritization based on protocol or application.

The various factors can be combined in a weighted form in one embodiment. Thus screen state or data inactivity time might be given more weight than wireless signal strength or device time in making a determination of whether the trigger has been met. However, other examples are possible.

In other embodiments, other factors or conditions may be used. For example, enterprise activated devices using an enterprise connected virtual private network can use triggers set by the enterprise on the device. For example, the values may be set in management software at the enterprise and pushed to the device using information technology policies. In this case, enterprise e-mail and data may take precedent for triggering determinations over user set preferences. In one embodiment, even when the battery level is less than 50%, an aggressive policy may be that the trigger is only activated outside of business hours and a very aggressive model may be that the trigger is activated outside of business hours or uses traffic prioritization based on enterprise or personal applications or protocols.

Other examples are possible.

The above therefore provides for dynamic triggers where the trigger varies based on the power optimization model. The above further provides for various factors that can determine which power optimization model that the device is in.

Once the criteria for the first trigger are met, the process proceeds from block 214 to block 220, in which a timer is started.

The value of the timer started at block 220 may be preconfigured on the device, set by an IT policy or set by a user, for example. The value of the timer may be selected to tradeoff between ensuring that any data transfer is identified and taking down the VPN connection as soon as possible. Specifically, data across the VPN connection may be bursty and the timer should be long enough to capture such sporadic data without waiting too long before tearing down the connection.

In some embodiments, the value of the timer set at block 220 can be static. In other embodiments the value of the timer set at block 220 may be dynamic. For example, a dynamic setting may use a power supply (e.g. battery) level to determine the time length. Thus, if the power supply or battery level of the device is below a threshold, the timer may be set to more aggressively tear down the VPN connection. Thus, a fully charged battery may lead to a longer timer value than a partially drained battery in some embodiments.

In other embodiments, the value of the timer may also be dynamically set based on the power optimization model used to determine the triggering event. Thus if the combination of time of day, battery level and charge state are used to determine that the device is in a very aggressive power optimization mode, the timer may be set to a value reflecting the very aggressive mode. The timer may be longer for a very passive mode than for a very aggressive mode.

The process proceeds from block 220 to block 230 in which a check is made to determine whether or not data is passed across the VPN connection. The data may either originate at the device or may originate from a VPN server and be passed to the device. Further, as used in block 230, data is application data, and does not include control traffic.

The check at block 230 determines whether or not data is transferred. If no data is transferred, the process proceeds to block 232 and checks whether or not the timer started at block 220 has expired. If not, the process proceeds back to block 230 to check for data.

Thus, the combination of blocks 230 and 232 wait for either data to arrive or the timer to expire.

If data arrives, the process proceeds from block 230 back to block 214 to check for the first trigger again.

In other embodiments, rather than proceeding back to block 214, the process may proceed to block 220 to restart the timer. In this case, the changing of the trigger at block 214 (e.g. use of the device or the connection to an external power source) may cause an interrupt which would clear the timers. Other examples are possible.

If, at block 232, the timer has expired, the process proceeds to block 240 and the VPN connection is disconnected. The tearing down of the VPN connection may involve signaling between a VPN client and server, or may simply involve the VPN client on the device to stop.

From block 240 the process proceeds to block 250 and ends.

The dual checks at block 214 and block 230 ensure that the device is inactive but also that the device has no data being sent across the VPN connection. In some cases a user may not be interacting with a device but may be still using the VPN connection. For example, if the user is listening to music being streamed over the VPN connection, then the user may not be physically interacting with the device and the device may enter into a stand-by mode, and this may be detected in block 214. However, the check at block 230 would determine that there is still data being passed across the VPN connection and thus the process would proceed back to block 214.

In other cases, the user may not be using the device and may not be using the VPN connection. Thus, after a certain period of inactivity the device enters stand-by mode and, for example, the screen or display may be powered down. Subsequently, the timer started at block 220 expires and the VPN connection is torn down since there is no data passing across the VPN connection.

Figure 3:
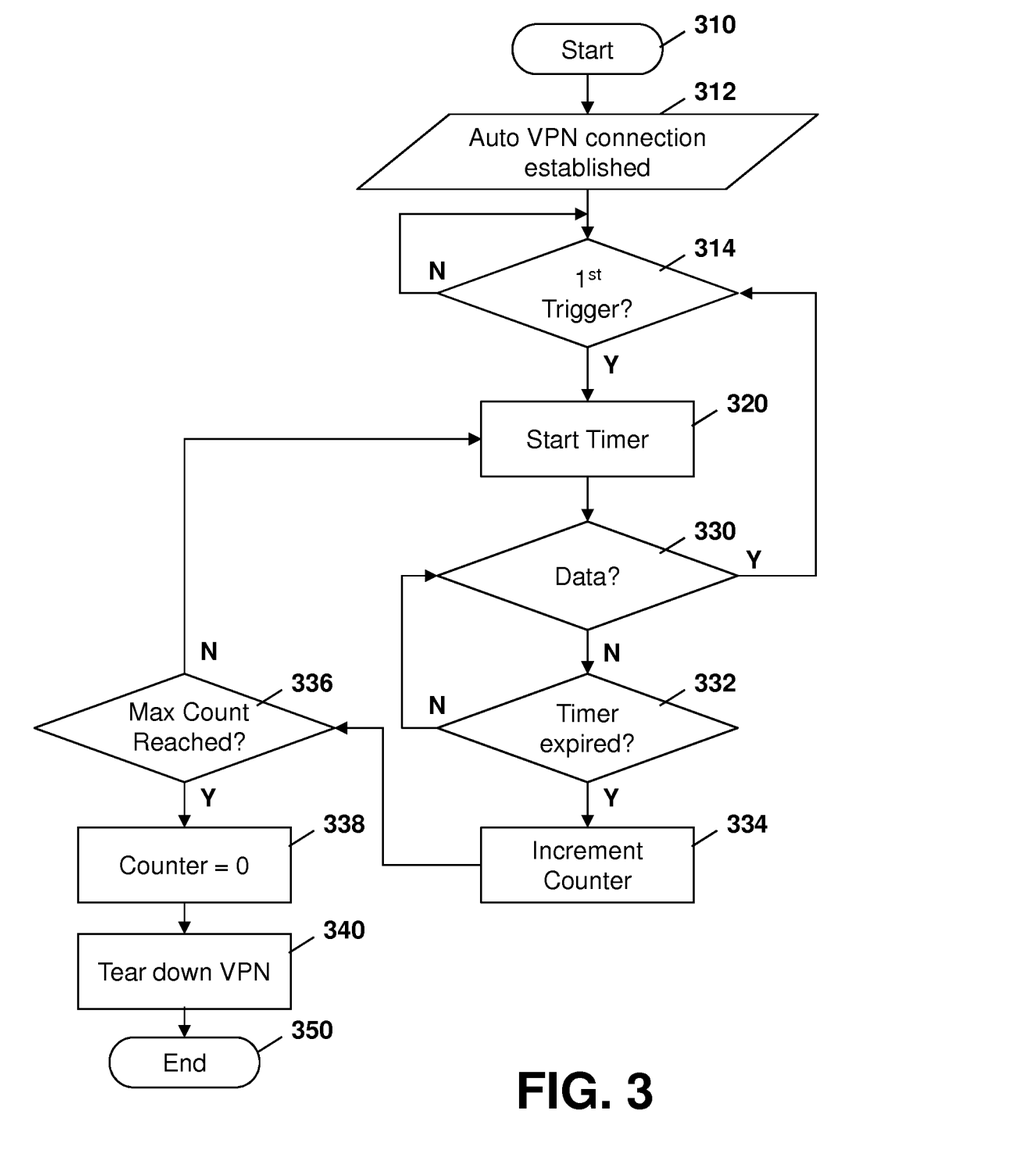
FIG. 3 is flow diagram showing an example process at a computing device for tearing down a VPN connection, the process having a plurality of timeout values.

In a further embodiment, rather than having a single timer for the entire check at block 232, the timer may be set for various increments. Reference is now made to FIG. 3. The process of FIG. 3 starts at block 310 and has a pre-condition, shown by block 312, that an automatic VPN connection has been established.

The process proceeds to block 314 to determine whether or not a first trigger has been met. The check at block 314 is similar to that at block 214 described above.

From block 314, the process proceeds to block 320 in which a timer is started. The process then proceeds to block 330 in which a check is made to determine whether data has been transferred.

If no, the process proceeds to block 332 to determine whether a timer has expired. If no data has arrived and the timer has not expired, the process continues to loop between blocks 330 and 332.

If data arrives, the process proceeds back to block 314 in which a check again is made to determine whether the first trigger has been met.

From block 332, if the timer has expired the process then proceeds to block 334 in which a counter is incremented. The counter may count the number of timer expires and from block 334 the process may proceed to block 336 in which a check is made to determine whether the count has reached a predetermined value. If not, the process may proceed back to block 320 to restart the timer and continue.

Conversely, if the count has reached a pre-determined value then the process proceeds to block 338 in which the count is reset to zero and the process then proceeds to block 340 in which the VPN connection is torn down.

The process then proceeds to block 360 and ends.

Thus, in accordance with FIG. 3, the timer could be broken down into a plurality of thresholds which have to be reached a certain number of times. For example, if the timer at block 220 of FIG. 2 was set to 30 seconds, in the embodiment of FIG. 3 the timer could be set to 10 seconds and the check at block 336 could determine whether or not the count has reached 3 prior to proceeding to block 338.

In the embodiments of FIGS. 2 and 3 above, a check could also be introduced, either between blocks 230 and 232 in FIG. 2, between block 330 and 332 in FIG. 3, or prior to the tearing down of the VPN connection at blocks 240 or 340, to determine whether or not the first trigger has still expired. Thus, for example, if the device enters a stand-by mode and the user immediately starts to use the device afterwards, it may be beneficial to avoid tearing the VPN connection and the additional check would prevent this from happening.

In one embodiment, since the VPN connection is automatic, it may be beneficial to restore the connection. In some embodiments, the connection may be restored once user interaction with the device occurs. In addition, or alternatively, it may be beneficial to restore the connection after a certain time period to check for any data that may be pending between the device and the server.

Figure 4:
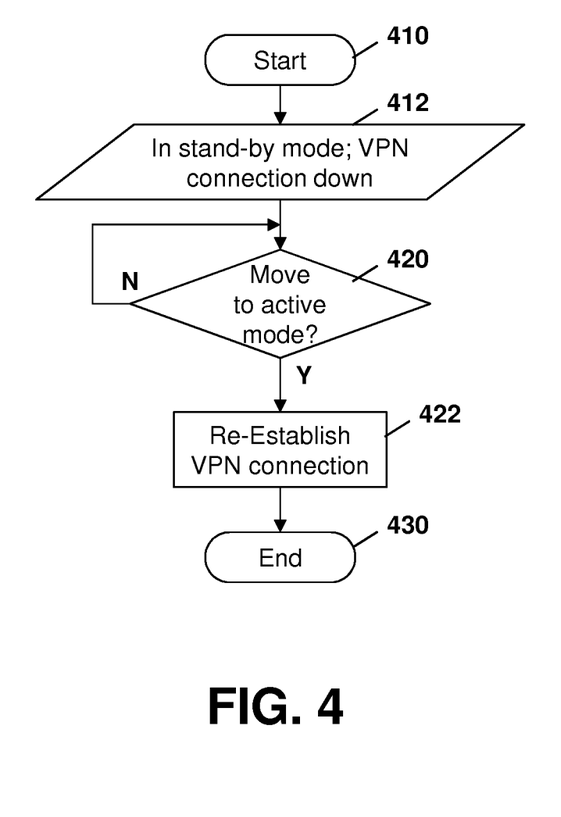
FIG. 4 is a flow diagram showing an example process at a computing device for re-establishing a VPN connection when transitioning the device to an active mode.

Reference is now made to FIG. 4. The process of FIG. 4 starts at block 410 and has a pre-condition that the device is in a stand-by mode, as shown by block 412.

The process proceeds to block 420 in which a check is made to determine whether the device has transitioned to an active mode. For example, this may occur with user interaction with the device.

If the device has not transitioned to active mode, the process proceeds to loop back to block 420.

Once the device transitions to an active mode, the process proceeds to block 422 in which the VPN connection is restored and the process then proceeds to block 430 and ends.

In some embodiments, rather than merely checking at block 420, that the device has transitioned to an active mode, the check at block 420 may instead determine whether the trigger for the particular power optimization mode that the device is in is no longer met. For example, if the device is in an aggressive power optimization mode where the trigger to tear down the VPN connection includes the wireless signal strength, and the wireless signal strength now exceeds a threshold, then the device may determine that the connection for the VPN should be restored. Other examples are possible.

In a further embodiment, the device may establish a connection periodically to check whether any data is pending for the device.

Figure 5:
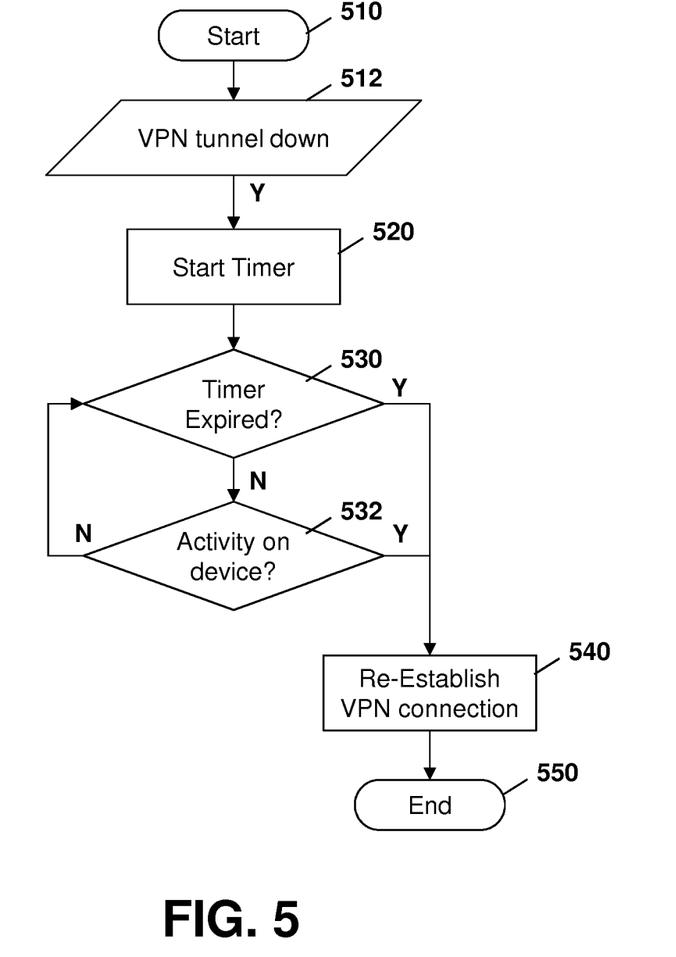
FIG. 5 is a flow diagram showing an example process at a computing device for re-establishing a VPN connection based on either transitioning the device to an active mode or periodically.

Reference is now made to FIG. 5. The process of FIG. 5 starts at block 510 and has a pre-condition that the device is in a stand-by mode and that the VPN connection is down.

The process proceeds to block 520 in which a timer is started. The value of the timer at block 520 may be set by a network IT administrator, a user, a device manufacturer, or a carrier, among others. The timer value may be sufficiently long to reduce power supply drain. For example, in one embodiment the timer may be 15 minutes.

As with the timer of FIGS. 2 and 3, the timer duration for the timer of block 520 can be static or dynamic. For example, a dynamic setting of the timer duration may be linked to the power source level of the device. The level of the power source may cause the timer duration to be extended or shorted in one embodiment. Thus, when the power source is more charged, the duration of the timer may be shorter to ensure data is not missed for too long, whereas if the power source is less charged, the duration of the timer may be longer to enhance power source savings.

Once the timer is started at block 520 the process proceeds to block 530 in which a check is made to determine whether or not the timer has expired.

If not, the process proceeds to block 532 in which a check is made to determine whether any activity has occurred on the device. Such activity could be user interaction with the device or the connection of the device to an external power source, for example.

If the timer has not expired and there is no activity on the device, the process continues to loop between blocks 530 and 532.

If the timer has expired at block 530, or there is device activity detected at block 532, the process proceeds to block 540 in which the VPN connection is re-established. Such re-establishing may use the automatic VPN connection profile as described above.

The process then proceeds to block 550 and ends.

Once the connection is re-established at block 540, the device may start the process of FIG. 2 or FIG. 3 again. In this case, if the connection is re-established based on the timer expiring, the trigger at blocks 214 or 314 may still be met, since the device may already be in the stand-by mode and not plugged in to an external power source, for example. Thus, in the processes of FIG. 2 or 3, the timer to check for data at blocks 220 and 320 could be started and if there is no data during the timer period then the connection could be torn down at blocks 240 or 340.

Thus, a combination of the embodiments of FIG. 2 or 3 with the embodiment of FIG. 5 could intelligently take down a VPN connection that is not being used but periodical check to determine whether the VPN connection is needed, thereby saving power resources on the device, network resources for signaling between the device and the server, potential reduce data charges for the device, among other factors.

Figure 6:
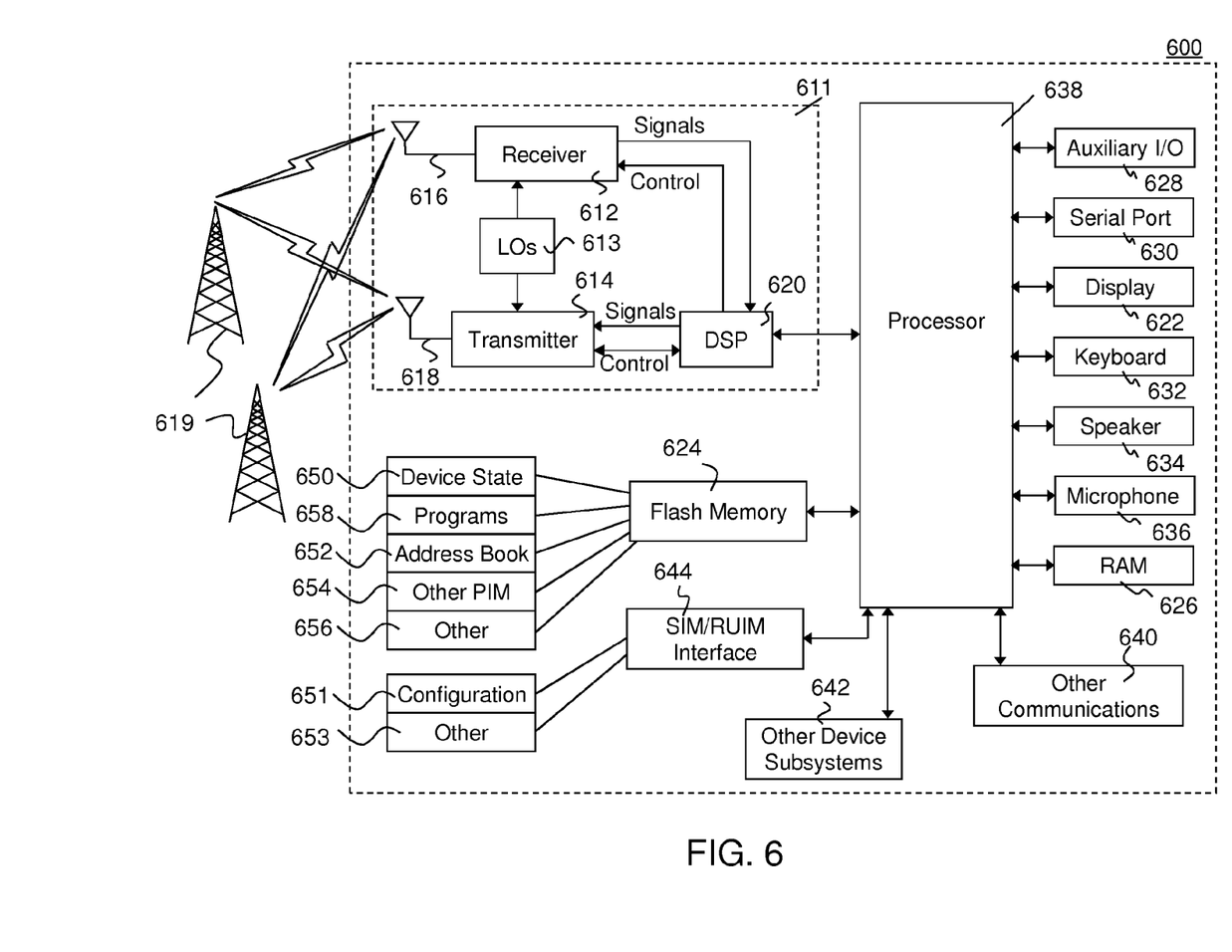
FIG. 6 is a block diagram showing an example mobile device capable of being used with the present disclosure.

The above embodiments may be implemented on any device. If the above is implemented on a mobile device, one example mobile device is shown below with regard to FIG. 6. The mobile device of FIG. 6 is however not meant to be limiting and other mobile devices could also be used.

Mobile device 600 may comprise a two-way wireless communication device having any of voice capabilities, data communication capabilities, or both. Mobile device 600 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a tablet, or a data communication device, as examples.

Where mobile device 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some networks, network access is associated with a subscriber or user of mobile device 600. A mobile device may require a removable user identity module (RUIM) or a subscriber identity module (SIM) card in order to operate on the network. The SIM/RUIM interface 644 may be similar to a card-slot into which a SIM/RUIM card can be inserted and ejected like a diskette or PCMCIA card. The SIM/RUIM card can have memory and hold many key configuration 651, and other information 653 such as identification, and subscriber related information.

When required network registration or activation procedures have been completed, mobile device 600 may send and receive communication signals over the network 619. As illustrated in FIG. 6, network 619 can consist of multiple base stations communicating with the mobile device. For example, in a hybrid CDMA 1×EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art having the benefit of the present disclosure.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list, among other applications.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements.

Processor 638, in addition to its operating system functions, may enable execution of software applications on the mobile device. A predetermined set of applications that control basic operations, including data or voice communication applications for example, as well as a predetermined set of certificates, will normally be installed on mobile device 600 during manufacturing. Other applications could be installed subsequently or dynamically.

Applications and software, such as those described above may be stored on any computer readable storage medium. The computer readable storage medium may be a tangible or intransitory/non-transitory medium such as optical (e.g., CD, DVD, etc.), magnetic (e.g., tape) or other memory known in the art.

One example software application may be a personal information manager (PIM) application having the ability to organize and manage data items relating to the user of the mobile device such as, but not limited to, e-mail, calendar events, voice mails, appointments, and task items. Further applications, include, but are not limited to, a VPN client, media player, camera, messenger, mail, calendar, address book, web browser, social networking, game, electronic book reader, map, or other application may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using a keyboard 632, which may comprise a virtual or physical keyboard or both, and may include a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to one or more speakers 634 and signals for transmission would be generated by a microphone 636. Alternative voice or audio I/O subsystems, such as a voice message recording subsystem, may also be implemented on mobile device 600. Although voice or audio signal output may be accomplished primarily through the one or more speakers 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, are further optional components which may provide for communication between mobile device 600 and different systems or devices, which need not necessarily be similar devices. For example, the subsystem 640 may include WiFi or WiMAX circuits, an infrared device and associated circuits and components, near field communications (NFC) or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a computing device configured to send and receive traffic over a virtual private network (VPN) connection, the method comprising:
    determining a battery level of the computing device;
    selecting a power optimization model based on the battery level of the computing device, the power optimization model defining conditions related to an operating context of the computing device;
    determining that the operating context of the computing device meets the conditions;
    responsive to the conditions being met, monitoring the VPN connection for inactivity for a first time period;
    wherein the monitoring for inactivity comprises:
        waiting for an inactivity timer to expire;
        resetting the inactivity timer when data is transmitted over the VPN connection; and
        upon the inactivity timer expiring, disconnecting the VPN connection.

2. The method of claim 1, wherein the first conditions include a transition of the computing device into a stand-by mode.

3. The method of claim 1, wherein the conditions include the computing device having only an internal power source.

4. The method of claim 1, wherein the conditions include an Internet Protocol address the VPN connection uses.

5. The method of claim 1, wherein the conditions include a wireless signal strength.

6. The method of claim 1, wherein the conditions include a signal to noise ratio.

7. The method of claim 1, wherein the conditions include an application or protocol using the VPN connection.

8. The method of claim 1, wherein the conditions include at least one factor selected from the group consisting of: a transition of the computing device into a stand-by mode; the computing device having only an internal power source; an Internet Protocol address the VPN connection uses; a wireless signal strength; a signal to noise ratio; and an application or protocol using the VPN connection.

9. The method of claim 8, wherein the conditions comprise a plurality of factors, and wherein each factor is provided with a weight.

10. The method of claim 1, wherein the first time period is dynamic and dependent on the power optimization model.

11. The method of claim 1, further comprising re-establishing the VPN connection upon the operating context of the computing device no longer meeting the conditions.

12. A computing device configured to send and receive traffic over virtual private network (VPN) connection, the computing device comprising:
    a processor;
    at least one battery; and
    a communications subsystem,
    wherein the computing device is configured to:
        determine a battery level of the at least one battery;
        select power optimization model based on the battery level of the computing device, the power optimization model defining conditions related to an operating context of the computing device;
        determine that the operating context of the computing device inerts the conditions;
        responsive to the conditions being met, monitor the VPN connection for inactivity for a first time period;
        wherein the monitoring for inactivity comprises:
            waiting for an inactivity timer to expire;
            resetting the inactivity timer when data is transmitted over the VPN connection; and
            upon the inactivity timer expiring, disconnecting the VPN connection.

13. The computing device of claim 12, wherein the conditions include at least one factor selected from the group consisting of: a transition of the computing device into a stand-by mode; the computing device having only an internal power source; an Internet Protocol address the VPN connection uses; a wireless signal strength; a signal to noise ratio; and an application or protocol using the VPN connection.

14. The computing device of claim 13, wherein the conditions comprise a plurality of factors, and wherein each factor is provided with a weight.

15. The computing device of claim 12, wherein the first time period is dynamic and dependent on the power optimization model.

16. The computing device of claim 12, further comprising re-establishing the VPN connection upon the operating context of the computing device no longer meeting the conditions.

17. A non-transitory computer readable medium having stored thereon executable code for execution by a processor of a computing device, the executable code comprising instructions for:
    determining a battery level of the computing device;
    selecting a power optimization model based on the battery level of the computing device, the power optimization model defining conditions related to an operating context of the computing device;
    determining that the operating context of the computing device meets the conditions;
    responsive to the conditions being met, monitoring a VPN connection for inactivity for a first time period;
    wherein the monitoring for inactivity comprises:
        waiting for an inactivity timer to expire;
        resetting the inactivity timer when data is transmitted over the VPN connection; and
        upon the inactivity timer expiring, disconnecting the VPN connection.

18. The non-transitory computer readable medium of claim 17, wherein the executable code further comprises instructions for:
    establishing the VPN connection upon the operating context of the computing device no longer meeting the conditions.

19. The non-transitory computer readable medium of claim 17, wherein the conditions comprise a plurality of factors, and wherein each factor is provided with a weight.

20. The non-transitory computer readable medium of claim 17, wherein the conditions include at least one factor selected from the group consisting of: a transition of the computing device into a stand-by mode; the computing device having only an internal power source; an Internet Protocol address the VPN connection uses; a wireless signal strength; a signal to noise ratio; and an application or protocol using the VPN connection.

\* \* \* \* \*